3,401,904
CROSS-CHANNEL MONITORING FOR AIRCRAFT
Raymond A. Nelson, Phoenix, Ariz., assignor to Sperry Rand Corporation, a corporation of Delaware
Filed Jan. 3, 1967, Ser. No. 606,813
4 Claims. (Cl. 244—77)

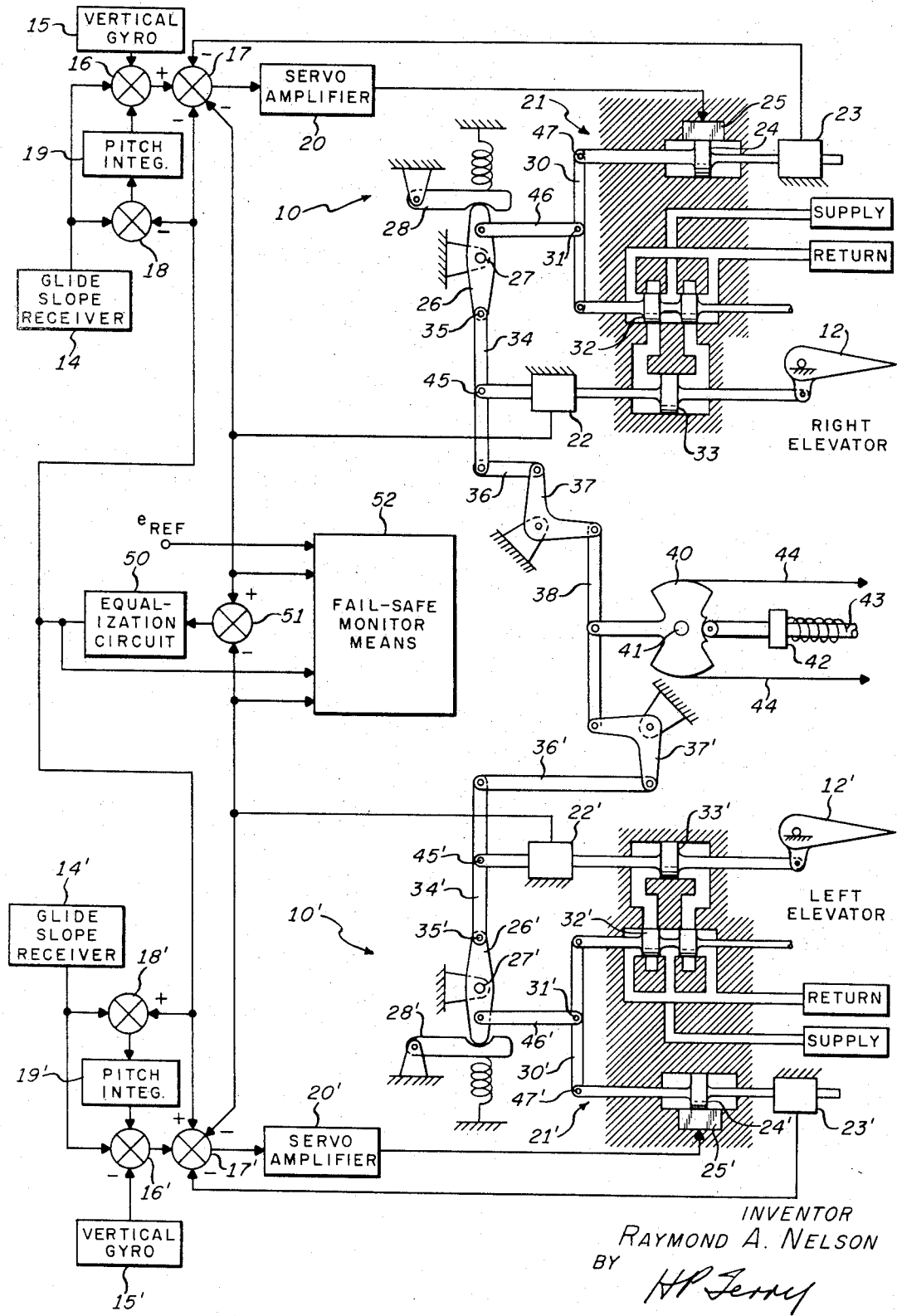

ABSTRACT OF THE DISCLOSURE

Cross-channel monitoring apparatus for detecting the sustained opposition of two substantially identical automatic control systems for controlling aircraft control surfaces with respect to a single aircraft control axis.

Background of the invention

The present invention relates to automatic control systems for aircraft and particularly to systems in which a plurality of independent control channels are operative with respect to a single axis for controlling respective control surfaces.

In one configuration, for example, with respect to the pitch channel, a first pitch control system is operative to control a left-hand elevator surface while a second independent but substantially identical pitch control system is operative to control an independent right-hand elevator surface. It is desirable to determine the existence of active or passive failures not only in the dual control systems but also in auxiliary apparatus including the monitoring circuitry itself.

Summary of the invention

The present invention provides for monitoring individual control systems of a dual channel automatic pilot for aircraft as well as monitoring the relative cross-channel operation and also monitoring the monitoring and auxiliary apparatus common to both channels. This is accomplished by monitoring signals representative of the difference between the relative operating parameters of the dual systems and rendering the common elements functionally fail-safe.

Brief description of the drawing

The single drawing is an electrical schematic wiring diagram partially in block form illustrating dual pitch control systems actuating respective independent right-hand and left-hand elevator control surfaces monitored in accordance with the present invention.

Description of the preferred embodiment

Referring now to the drawing, the present invention will be described with respect to an aircraft control system which controls an aircraft in pitch. The over-all pitch control system includes first and second elevator control systems 10 and 10' respectively, which independently control the left-hand elevator control surface 12 and the right-hand elevator control surface 12' respectively. The first elevator control system 10 includes a glide slope receiver 14, for example, which provides signals representative of the displacement of the aircraft with respect to a desired glide slope. The system 10 also includes a vertical gyroscope 15 which provides signals representative of the pitch attitude of the aircraft. The glide slope displacement signals and the pitch attitude signals are summed in algebraic summation device 16 which in turn is connected to an input terminal of an algebraic summation device 17. The displacement signal from the glide slope receiver 14 is connected through an algebraic summation device 18 to a pitch integrator 19 which provides an output signal representative of the integral with respect to time of the glide slope displacement signal that in turn is connected to another input terminal of the algebraic summation device 17. The output terminal of the algebraic summation device 17 is connected to a servo amplifier 20. The amplified output signal from the amplifier 20 is connected to an elevator electrohydraulic servo actuator 21 that is mechanically connected to position the elevator control surface 12 in accordance with the output from the amplifier 20.

A position pick-off device 22 is coupled to the elevator 12 to provide a signal representative of the position of the elevator 12 with respect to a streamline condition. The pick-off 22 has its output coupled to an input terminal of the algebraic summation device 17 to provide a degenerative or negative position feedback signal in a conventional manner to the servo amplifier 20. A velocity pick-off device 23 is coupled to the modulating piston 24 to provide a velocity feedback signal to the servo amplifier 20 via an input terminal of the summation device 17 for servo loop damping purposes.

The second elevator control system 10' comprises identical elements indicated by primed reference numerals connected in an identical manner to independently control the right-hand elevator control surface 12' and a detailed explanation thereof is therefore omitted for purposes of simplicity.

In operation, when the electrohydraulic transfer valve 25 of the actuator 21 receives an input signal from the servo amplifier 20, it causes the modulating piston 24 to move at a rate proportional to the input current. The linkage 26 is prevented from rotating about its pivot point 27 by the downward spring force exerted on the torque limit detent cam 28. Therefore, the modulating piston motion causes the link 30 to rotate about pivot-point 31 and displaces the control valve 32. The actuator control piston 33 moves the right elevator 12 at a rate proportional to the control valve displacement. The control piston 33 also drives the link 34 and causes it to rotate about pivot-point 35, since the link 26 is restrained by the detent cam 28. Therefore, the link 36, the bellcrank 37 and the link 38 move to rotate the quadrant 40 about the pivot-point 41. The feel actuator 42 exerts an initial preload force, and as the quadrant 40 rotates, cam action further compresses the feel actuator 42 against a hydraulic spring force schematically illustrated by helical spring 43. The control cables 44 are connected to quadrant 40 so that the pilot's control column (not shown) moves with the quadrant 40.

Each of the actuators 21 and 21' has two electrical feedbacks to their respective servo amplifiers 20 and 20'. The actuator position sensors 22 and 22' provide position feedback while the modulating piston sensors 25 and 25' provide velocity feedback for servo loop damping.

It will be appreciated that utilizing independent control systems 10 and 10' controlling independent elevator control surfaces 12 and 12', respectively, will result usually in the elevator control surfaces 12 and 12' each being commanded to somewhat different positions due to the commands from the sensors and the tolerances in the two independent systems 10 and 10' being slightly different although their individual components are substantially identical.

These differences tend to be equalized by means of the equalization circuit 50 which provides equalization signals for both short-term and long-term compensation in a manner described in detail in U.S. patent application S.N. 597,060, filed Nov. 25, 1966, and entitled "Automatic Control System Equalization for Aircraft" of Raymond A. Nelson. The equalization circuit 50 is responsive to the difference in the position feedback signals from the pick-offs 22 and 22' via algebraic summation device 51. The output of the equalization circuit 50 is connected to input terminals of the algebraic summation devices 17, 18 and 17', 18', in a manner described in said U.S. patent application S.N. 597,060.

Assume now that the actuator 21' is not engaged, i.e., that its torque limit detent cam 28' is not restraining link 26' of the actuator 21' (even though the drawing shows it engaged). Then rotation of the quadrant 40 causes the link 38', the bellcrank 37' and the link 36' of the actuator 21' to move. Since the actuator 21' is irreversible, the point 45' becomes the pivot for the link 34'; therefore, the link 26' rotates about pivot 27' driving the link 46'. Since the actuator 21' is assumed to be in the autopilot disengaged mode, its modulating piston 24' is caged by a conventional caging device not shown. Therefore, the point 47' is the pivot for the link 30' which rotates to move the control valve 32' and thus the control piston 33' of the actuator 21'. Thus, the left elevator 12' moves to follow the right elevator 12. Mechanical feedback from the control piston 33' displaces point 45' and causes the link 26' to rotate in a direction to recenter the control valve 32'. There is negligible loading of the linkages of the actuator 21', since the only forces required are those to overcome valve and pivot frictions.

Under the assumption that the actuator 21' is not in the autopilot engaged configuration, the signal path through the equalizer circuit 50 is shorted out. Therefore, the elevator displacements will be proportional to the sum of signals from the respective vertical gyro 15, the pitch integrator 19 and glide slope receiver 14.

As the right elevator 12 deflects in response to these autopilot commands, it rotates the quadrant 40 as described above. In causing the feel actuator spring 43 to compress, a reaction force is developed at the torque limit detent cam 28 of the actuator 21, up to the point where this reaction force is equal to the spring preload holding the cam 28 against link 26. Any further deflection of the elevator 12 causes the link 26 to rotate out of the detent position, i.e., "cam-out." This in turn moves the control valve 32 via links 30 and 46 in a direction to cut off the pressure fluid to the actuator control piston 33, thus preventing any further elevator deflection. The mechanical advantage is such that only a few tenths of a degree of elevator motion is required to yield control valve motion which completely cancels the autopilot input to the modulating piston 24, once the "cam-out" has occurred.

Now consider the case for both actuators 21 and 21' in the autopilot engaged configuration with an initial condition of all signals zero with both elevators 12 and 12' centered. Assume also that the gain of the equalizer circuit 50 is zero. If a command is then put into the servo amplifier 20, as the elevator 12 starts to move and through the control linkages rotate the quadrant 40, the linkages of the actuator 21' try to rotate the link 26'. However, the link 26' is now restrained by its detent cam 28'. The reaction force generated at the cam 28 is now the sum of the feel actuator preload force and the cam detent force of the actuator 21'. Since the sum of these two forces is greater than the cam detent force of the actuator 21, link 26 rotates (cams-out) thus causing motion of the control valve 32 to cancel the autopilot command. As a result, the right elevator deflection is limited to only a few tenths of a degree, and the left elevator 12' doesn't move at all, initially. However, the airplane will respond to the right elevator deflection (although small), resulting in an error signal to the servo amplifier 20'. This commands the left elevator 12' to deflect in a direction to oppose the right elevator 12. Now, the reaction force at the cam 28' will be the sum of the cam force of the actuator 21 and the feel actuator detent force, and since this sum exceeds the cam detent force of the actuator 21', link 26' will cam-out with only a few tenths of a degree of left elevator deflection required to move the control valve 32' and cancel the autopilot command.

Therefore, the dual system is seen to be "fail-safe," since a hardover input on one side results in "cam-out" of both actuators 21 and 21' with the right and left elevators 12 and 12' respectively slightly deflected in opposing directions. The steady-state differential elevator during dual cam-out is a function of the mechanical advantage from the control piston back to the control valve, as well as the compliances of the various control linkages and may, for example, be in the order of two degrees.

As explained above, an active or passive failure of either of the dual systems 10 and 10' will cause the two actuators 21 and 21' to cam-out in opposite directions as soon as the equalizer circuitry authority is exceeded, i.e., the equalizer circuit 50 saturates. The over-all system is then rendered potentially unsafe since a subsequent failure in the remaining operative channel might cause a "hardover" condition which would be transmitted to both actuators. Since the equalizer authority limit is indicative of cam-out, the input and the output of the equalizer circuit 50 is monitored by means of a fail-safe monitor means 52. This may be accomplished by connecting the outputs of the position pick-offs 22 and 22' which are in phase opposition to input terminals of the monitor means 52 and by connecting the output of the equalizer circuit 50 to an input terminal of the monitor means 52. The monitor means 52 may include a detector or comparison means of the type disclosed in U.S. Patent No. 3,252,058 issued May 17, 1966, entitled "System for Detecting a Monitoring Input" invented by K. E. Close and issued to the same assignee as the present invention. Within the linear range of operation of the equalizer circuit, its input and output will differ only by a scale factor that is taken into consideration in the monitor means 52. The monitor means 52 is also responsive to a reference voltage indicated as $e_{ref}$ which establishes a threshold corresponding, for example, to the equalizer input exceeding its output limit by 50 percent. A time delay may also be incorporated in the monitor means 52 to avoid nuisance warnings. The combination of threshold and time delay is selected to minimize nuisance warnings from transient cam-out conditions without sacrificing safety. The monitoring means 52 may include a warning light which is illuminated in the event of malfunction and may also include provision for disengagement of the automatic pilot in that event.

In operation, normally the difference of the signals from the pick-offs 22 and 22' is equal and opposite to the output signal from the equalizer 50 and thus there is no malfunction signal. This may be accomplished, for example, by holding relays (not shown) in the monitoring means 52 in an "on" condition.

An active or passive failure of either system 10 or 10' causes the equalizer circuit 50 to saturate when the limit value is reached and then its input and output signals will no longer track and cam-out occurs as explained above. When a malfunction occurs causing opposing cam-outs, this condition is sustained.

Further, the input to the equalizer 50 will immediately increase to twice the equalizer output (normalized to an equalizer gain of unity). The difference between the signals being compared in the monitor means 52 exceeds the threshold limit causing, for example, the relays in the monitor means 52 to drop out to warn of improper tracking of the input and output signals of the equalizer 50.

Since cam-out can also happen in a transient condition when the command signals to the two servo systems 10 and 10' differ sufficiently in amplitude, the combination of threshold and time delay minimizes nuisance warnings. The combination of the fail-safe comparison monitor means 52 and fail-safe equalizer 50 also yields an early warning of an equalizer passive failure. The equalizer input signals from the pick-offs 22 and 22' are routed separately to the monitor 52 to protect from an open wire failure which might otherwise go undetected.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. Apparatus for monitoring first and second substantially identical control systems for controlling first and second control surfaces respectively of an aircraft comprising, first and second pick-off means responsive to the movement of said first and second control surfaces respectively for providing first and second signals representative of the magnitude and sense of the movement of said first and second control surfaces respectively from a predetermined condition, equalization means responsive to said first and second signals for providing equalization signals representative of the difference between said first and second signals to said first and second control systems thereby tending to drive said control surfaces towards the same position below a predetermined authority limit, monitoring means responsive to the difference between said first and second signals and said equalization signals for providing a comparison between said difference and said equalization signals which is indicative of a malfunction when the result of said comparison exceeds a predetermined value.

2. Apparatus of the character recited in claim 1 in which said equalization means includes inherent authority limiting means comprised of passive circuit means.

3. Apparatus of the character recited in claim 1 in which said monitoring means includes threshold means for establishing a threshold reference voltage to minimize transient nuisance indications.

4. Apparatus of the character recited in claim 1 in which said monitoring means includes time delay means for minimizing transient nuisance indication.

References Cited

UNITED STATES PATENTS

| 3,071,336 | 1/1963 | Fearnside | 244—77 |
| 3,219,295 | 11/1965 | Hastings | 244—77 |

FOREIGN PATENTS 897,627  5/1962  Great Britain.

MILTON BUCHLER, *Primary Examiner.*

B. BELKIN, *Assistant Examiner.*